United States Patent [19]
Buchner

[11] 3,940,912
[45] Mar. 2, 1976

[54] METHOD FOR PREPARATION OF DEUTERIUM BY ISOTOPE SEPARATION

[75] Inventor: Helmut Buchner, Wendlingen, Germany

[73] Assignee: Daimler-Benz Aktiengesellschaft, Germany

[22] Filed: Feb. 14, 1974

[21] Appl. No.: 442,638

[30] Foreign Application Priority Data
Feb. 14, 1973 Germany.............................2307180

[52] U.S. Cl........................................ 55/16; 55/158
[51] Int. Cl.². .......................................... B01D 53/22
[58] Field of Search .................... 55/16, 66, 74, 158

[56] References Cited
UNITED STATES PATENTS

| | | |
|---|---|---|
| 3,148,031 | 9/1964 | Vahldieck et al...................... 55/16 |
| 3,155,467 | 10/1964 | Yamamoto et al..................... 55/16 |
| 3,208,197 | 9/1965 | Simon et al............................ 55/16 |
| 3,467,493 | 9/1969 | Eguchi et al........................... 55/66 |

*Primary Examiner*—Charles N. Hart
*Attorney, Agent, or Firm*—Craig & Antonelli

[57] ABSTRACT

A method for separating deuterium from hydrogen in which the gaseous mixture of deuterium and hydrogen is brought into contact with TiNi, Ti₂Ni or a mixture of these alloys and after a delay sufficient for the absorption of hydrogen in the metal alloy, the non-absorbed residual gas is separated from the metal alloy.

24 Claims, 1 Drawing Figure

U.S. Patent  March 2, 1976  3,940,912
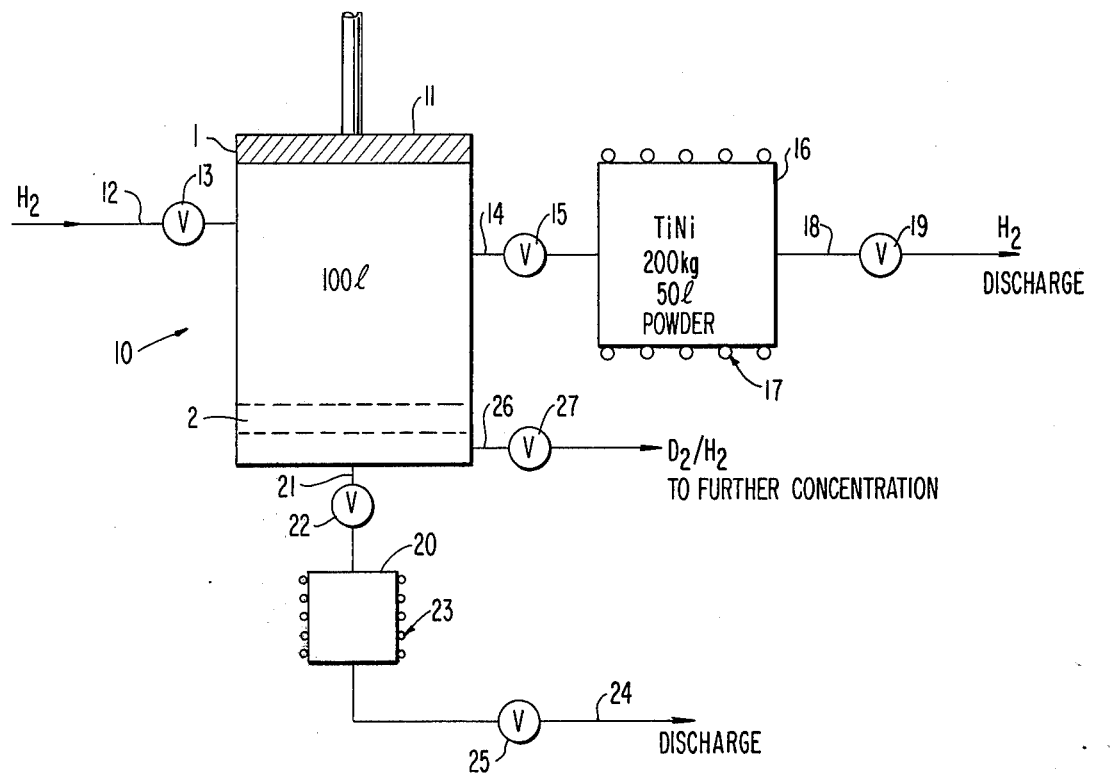

METHOD FOR PREPARATION OF DEUTERIUM BY ISOTOPE SEPARATION

The present invention relates to a process for the separation of deuterium and hydrogen.

For the manufacture of the technically very important heavy water, $D_2O$, essentially the following physically different methods are used:

In the Clusius separation column process, the effect of the thermo-diffusion and thermo-convection are utilized. Hydrogen as the lighter component thereby rises along a heated wire in the center of a glass column approximately 20 meters in length, whereas deuterium as heavier component of the gas mixture sinks down along the cool column wall. Consequently, the pure hydrogen is conducted away at the upper column end whereas pure deuterium is obtained at the lower end.

In order to achieve a higher efficiency of the separating column process, the latter is coupled with an ultra-centrifuge. In a centrifuge running at very high rotational speed, the lighter isotope also concentrates in the center whereas the heavier isotope concentrates at the edge, whence the thermal-diffusion effect is assisted.

If one starts with liquid hydrogen in the deuterium recovery, then one obtains by fractionated distillation an enrichment or collection of hydrogen in the vapor and of deuterium in the liquid.

Also in chemical exchange reactions between liquid and vapor phase, nearly always a shift in the isotope ratio takes place. Thus, in the sulfur hydrogen method, the $H_2S$ gas, conducted through hot water, absorbs deuterium in order to give off the same again to cold water during the exchange and to concentrate or enrich thereat.

According to the last-mentioned method, $D_2O$ is manufactured in Canada, the country with the largest heavy water reactors. The planning of additional power reactors on the basis of heavy water has caused a bottleneck in the $D_2O$ supply so that the requirements cannot be met. This shortage in $D_2O$ and the manufacturing process itself lead to high prices for the heavy water.

It is the aim of the present invention to obtain both a less expensive method of manufacturing as also an increased production rate in deuterium and therewith in heavy water.

It has been discovered that the two alloys, namely $Ti_2Ni$ and TiNi, are able to absorb in the lattice thereof, hydrogen in very large quantities but deuterium only very slightly or not at all at temperatures up to 350° C., especially at temperatures of about 50° to about 150° C.

If one uses specifically TiNi for such separating experiments, then exclusively hydrogen is absorbed in large quantities whereas the gas residue is enriched with deuterium above the TiNi inserted as powder or as solid body.

The alloys of $Ti_2Ni$ and the alloy mixtures $Ti_2Ni$/TiNi also behave similarly.

Accordingly, it is an object of the present invention to provide a method for obtaining deuterium by isotope separation which avoids by simple means the aforementioned shortcomings and drawbacks encountered in the prior art.

Another object of the present invention resides in a method of obtaining deuterium by isotopic separation which entails a reduction in the cost of manufacture as well as a higher production rate due to improved efficiency.

Still a further object of the present invention resides in a process for obtaining deuterium by isotope separation at titanium-nickel phases, which is simple and relatively inexpensive, yet considerably increases the yield.

These and further objects, features and advantages of the present invention will become more apparent from the following description, setting forth a preferred embodiment of the present invention.

The aim of the present invention is, as mentioned above, a method for the separation of deuterium and hydrogen which essentially consists in that one causes the gaseous deuterium-containing hydrogen to come into contact with TiNi, $Ti_2Ni$ or mixtures thereof and to separate the non-absorbed gaseous residue from the TiNi alloy and to isolate the gas enriched with deuterium or to conduct the same for further enrichment or concentrations. Metal additions of the group IIIb – VIIIb, as well as copper and traces of the rare earth metals are able to influence the behavior of the alloys. Thus, an addition of zirconium facilitates the hydrogen separation out of the phases whereas copper addition increases the mechanical rigidity. Depending on the desired type of application, such additives may therefore be preferred.

The isotope separating effect of the two alloys and of the alloy mixtures by reason of the hydrogen absorption in the alloy lattice may be used to advantage in two different ways for the manufacture of pure deuterium or for the deuterium enrichment.

One typical example of a method of operation according to the present invention essentially consists in bringing the hydrogen/deuterium mixture into contact with the respective alloys free of hydrogen by way of various stages. The deuterium content in the residual gas therefore increases constantly and the mixture strongly enriched with deuterium can be conducted again either in a continuous, closed cycle process over the dehydrogenated alloys, or can be separated according to known methods, known as such in the prior art.

Another possibility of the present invention essentially resides in filling a Clusius separating column with a powder of the aforementioned TiNi alloys and to utilize now in common the absorption effect and the thermal effect. The heating wire of the column is therefore surrounded by the powder and the hydrogen concentration drop along the column is clearly increased by the high hydrogen absorption of the alloys. Of course, for purposes of filling, for example, also sintered bodies or granulates of the alloys may be used, though a powder filling is most simple.

The waste product or by-product of the separating process, namely the more or less fully hydrogenated titanium/nickel alloys, may in their turn again find a large commercial use in the battery construction and as pressureless hydrogen storage means, or they are dehydrated so that the metal can be fed again to the renewed contact with the hydrogen/deuterium gas. The dehydrogenation may take place in a conventional known manner, for example, by heating possibly assisted by a vacuum.

Since the price per kilo of the TiNi alloys at present amounts to only DM 10 — and since the enrichment processes can take place very rapidly, the production costs can be decreased by means of the process according to the present invention, and the yearly production quantities of the D₂O may be increased. A typical example utilizing the method according to the present invention is as follows:

Within the range of between about 20° and 200° C. and at pressures of about one atmosphere to about 200 atmospheres, up to 33 ⅓ atom percent ≅ 1 percent by weight of hydrogen are incorporated as TiNiH in the TiNi alloy. In contrast thereto under the same condition no dissolution of deuterium takes place in the TiNi-lattice, as can be readily proved. Hydrogen consists to about 99.9855% of the isotope $_1{}^1H$ and to about 0.0145% of the isotope $_1{}^2D$. Consequently, 0.145 mol of deuterium correspond to 1,000 mol of hydrogen each. If one causes the content of a 100 liter pressure container with a filling pressure of 224 atmospheres (1,000 mol hydrogen) to react with the TiNi alloy at temperatures at which the dissociation pressure of the hydrogen amounts to at most 2 atmospheres, then 1,000 mol hydrogen are dissolved in 200 kg TiNi (50 l volume) within the temperature range between about 20° C. and about 250° C. If now the pressure container is now disconnected at an interior pressure of one atmosphere, then only about 5 mol hydrogen remain in the container whereas 0.145 mol deuterium remain in the same since this was not absorbed in the TiNi-lattice. If this residual gas is compressed to a volume of 500 cm³ (approximately 220 atmospheres) and is brought into contact under the conditions indicated hereinabove with 1.5 kg TiNi, then the residual gas resulting therefrom consists at about 5 atmospheres of 0.02 mol hydrogen and 0.145 mol deuterium.

The speed of separation depends only on the cooling speed of the TiNi alloy (reaction enthalpy smaller than 10 k cal/mol H₂), it amounts with the aforementioned dimensions and with a sufficient water cooling to about 15 to 30 minutes.

Consequently, in only two stages the ratio H:D of 7000:1 can be changed into 1:7, i.e., by about a factor of 50,000. A greater enrichment or concentration can be realized either by way of further hydride stages or with the aid of other known methods (Clusius separating column). In that connection the thermal separating effect can possibly be further assisted by the absorption of the hydrogen in the TiNi alloy. Consequently, depending on the desired efficiency, any required quantity of the TiNi alloy can be brought into the respectively desired temperature zone in the Clusius column.

The powder particle sizes is not uniform and may be selected between about 10μ and about 1 mm.

The mixtures may be between 0–100% and 100–0% of Ti₂Ni and TiNi.

The dehydrogenation takes place at pressures of about 0.1 atmosphere beginning with temperatures of about 100° C. and with greater velocity beginning with temperatures of about 200° – 250° C.

Up to about 10% by weight of zirconium may be used instead of titanium for reducing the binding enthalpy of the hydrogen.

Up to about 25% by weight of copper may be used instead of nickel to produce a better mechanical stability of the individual granules. Nonetheless, the porosity and form of the sintered bodies remain preserved.

In the drawing the single FIGURE schematically illustrates an installation which may be used for carrying out the present invention.

Reference numeral 10 thereby generally designates a conventional pressure vessel or container having a piston or plunger 11 which is adapted to be actuated by conventional means. Hydrogen is fed into the vessel 10 at 224 atmospheres through inlet line 12 by way of control valve 13. The pressure container 10 is connected, on the one hand, by way of a line 14 containing a control valve 15 with a second container or vessel 16 which contains TiNi powder, for example, 200 kg (50 l) of the alloy. The vessel 16 is appropriately heated or cooled by the use of conventional means, such as an appropriate conventional heating and cooling system generally designated by reference numeral 17 and therefore only schematically indicated. The discharge or removal from the container 16 takes place by way of a line 18 including a control valve 19.

The pressure container 10 is further connected with a small vessel or container 20 by way of a line 21 containing a control valve 22. The container 20 is again adapted to be heated and cooled by conventional means only schematically indicated and designated generally by reference numeral 23. For example, about 1.5 kg of the TiNi powder is provided in the container 20. The outlet from the container 20 takes place by way of line 24 including the control valve 25.

A further line 26 including a control valve 27 is provided to permit the removal of D₂ and H₂ for further enrichment of concentration.

In the position 1 of the piston 11, valves 15, 19, 22 and 27 are closed while valve 13 is opened. The pressure in the 100 liter vessel or container 10 is 224 atmospheres. The valve 13 is then closed and valve 15 is opened. The hydrogen then reacts with the TiNi alloy in the container 16. The pressure in the container 10 is now permitted to become about 1 atmosphere and valve 15 is closed.

The piston 11 is now moved to its position 2 indicated in dash lines whereupon the valve 19 is opened, the heating system 17 is controlled to increase the temperature by about 100° C. thereby causing a discharge of hydrogen out of the TiNi container 16.

The pressure underneath the piston 11 is about 200 atmospheres. Valve 22 is now opened and the hydrogen reacts with the TiNi powder in the container 20. The pressure under the piston 11 is thereby permitted to become about 5 atmospheres. Valve 22 is now closed and valve 25 is opened while the heating system 23 is controlled to provide an increase of about 100° C. causing a discharge of H₂. Thereupon the heating system 17 is controlled to reduce the temperature by about 100° C., valve 27 is opened until the pressure under the piston reaches about 10⁻² Torr. Valve 27 and valve 25 are then closed and the heating system 23 is controlled to reduce the heat by about 100° C.

While I have shown and described only one embodiment in accordance with the present invention, it is understood that the same is not limited thereto but is susceptible of numerous changes and modifications as known to those skilled in the art and I, therefore, do not wish to be limited to the details shown and described herein but intend to cover all such changes and modifications as are encompassed by the scope of the appended claims.

What I claim is:

1. A method for separating deuterium and hydrogen, comprising the steps of bringing into contact a gaseous mixture of deuterium and hydrogen with a metal alloy material consisting essentially of TiNi, Ti₂Ni, or a mixture thereof, and thereafter separating a non-absorbed residual gas enriched in deuterium from the metal alloy material after a period of time sufficient for the absorption of hydrogen in the metal alloy material.

2. A method according to claim 1, characterized in that the absorption is carried out at temperatures up to about 300° C.

3. A method according to claim 2, characterized in that the absorption is carried out at temperatures of between about 50° and about 150° C.

4. A method according to claim 3, characterized in that a hydrogen and deuterium mixture is brought into contact, in stages, with said metal alloy material in dehydrogenated powder form to provide a non-absorbed residual gas having a constantly increasing deuterium content.

5. A method according to claim 3, characterized in that the hydrogen/deuterium mixture is passed in continuous circulation over a said metal alloy material in a dehydrogenated form.

6. A method acording to claim 3, characterized in that a gaseous mixture of hydrogen and deuterium is passed through a closed cycle operation to cause said mixture to come into contact with the metal alloy material.

7. A method according to claim 3, characterized in that a separating installation is filled with the metal alloy material in powder form.

8. A method according to claim 7, characterized in that the separating installation is completely filled with the metal alloy material in powder form.

9. A method according to claim 7, characterized in that the separating installation is partially filled with the metal alloy material in powder form.

10. A method according to claim 7, characterized in that the separating installation is a Clusius separating column.

11. A method according to claim 3, characterized in that a Clusius separating column of a material permeable to hydrogen is used and the inside thereof is covered with a compact layer of the metal alloy material.

12. A method according to claim 1, characterized in that a hydrogen and deuterium mixture is brought into contact, in stages, with dehydrogenated portions of said metal alloy material in powder form to provide a non-absorbed reesidual gas, the deuterium content of which increases from one stage to the other.

13. A method according to claim 1, characterized in that the hydrogen/deuterium mixture is passed in continuous circulation over a said metal alloy material in a dehydrogenated form.

14. A method according to claim 1, characterized in that a gaseous mixture of hydrogen and deuterium is passed through a closed cycle operation to cause said mixture to come into contact with the metal alloy material.

15. A method according to claim 1, characterized in that a separating installation is filled with the metal alloy material in powder form.

16. A method according to claim 15, characterized in that the separating installation is completely filled with the metal alloy material in powder form.

17. A method according to claim 15, characterized in that the separating installation is partially filled with the metal alloy material in powder form.

18. A method according to claim 15, characterized in that the separating installation is a Clusius separating column.

19. A method for separating deuterium and hydrogen, comprising the steps of bringing into contact a gaseous mixture of deuterium and hydrogen with a metal alloy material selected from the group consisting of $TiNi$, $Ti_2Ni$, and a mixture $TiNi$ and $Ti_2Ni$ in a Clusius separating column of a porous matrix whose pores are filled with the metal alloy material, thereafter separating a non-absorbed residual gas from the metal alloy material after a period of time sufficient for the absorption of hydrogen in the metal alloy material and conducting away hydrogen diffused through the column wall kept at temperatures up to about 300°C. maximum.

20. A method according to claim 19, characterized in that the column wall is kept at a temperature of about 50° to about 150° C.

21. A method according to claim 19, characterized in that the diffused hydrogen is continuously carried off.

22. A method according to claim 19, characterized in that the diffused hydrogen is intermittently carried away.

23. A method according to claim 1, characterized in that a Clusius separating column of a material permeable to hydrogen is used and the inside thereof is covered with a compact layer of the metal alloy material.

24. A process for producing deuterium-enriched gas, which comprises contacting a gaseous mixture of deuterium and hydrogen at temperatures up to about 300°C. with a metal alloy material consisting essentially of $TiNi$, $Ti_2Ni$ or a mixture of $TiNi$ and $Ti_2Ni$ for a period of time sufficient to absorb hydrogen in said material and to provide a deuterium-enriched residue gas, separating said residue gas from said material, heating the material having hydrogen absorbed therein to cause dehydrogenation and discharge of hydrogen from said material, thereafter contacting said dehydrogenation material with said gaseous mixture of deuterium and hydrogen or said deuterium-enriched residue gas to absorb additional hydrogen and to provide another deuterium-enriched residue gas, and separating said another deuterium-enriched residue gas from said material.

* * * * *